Nov. 20, 1928.
L. R. WINN
1,692,014
CALIPERS
Filed April 18, 1927
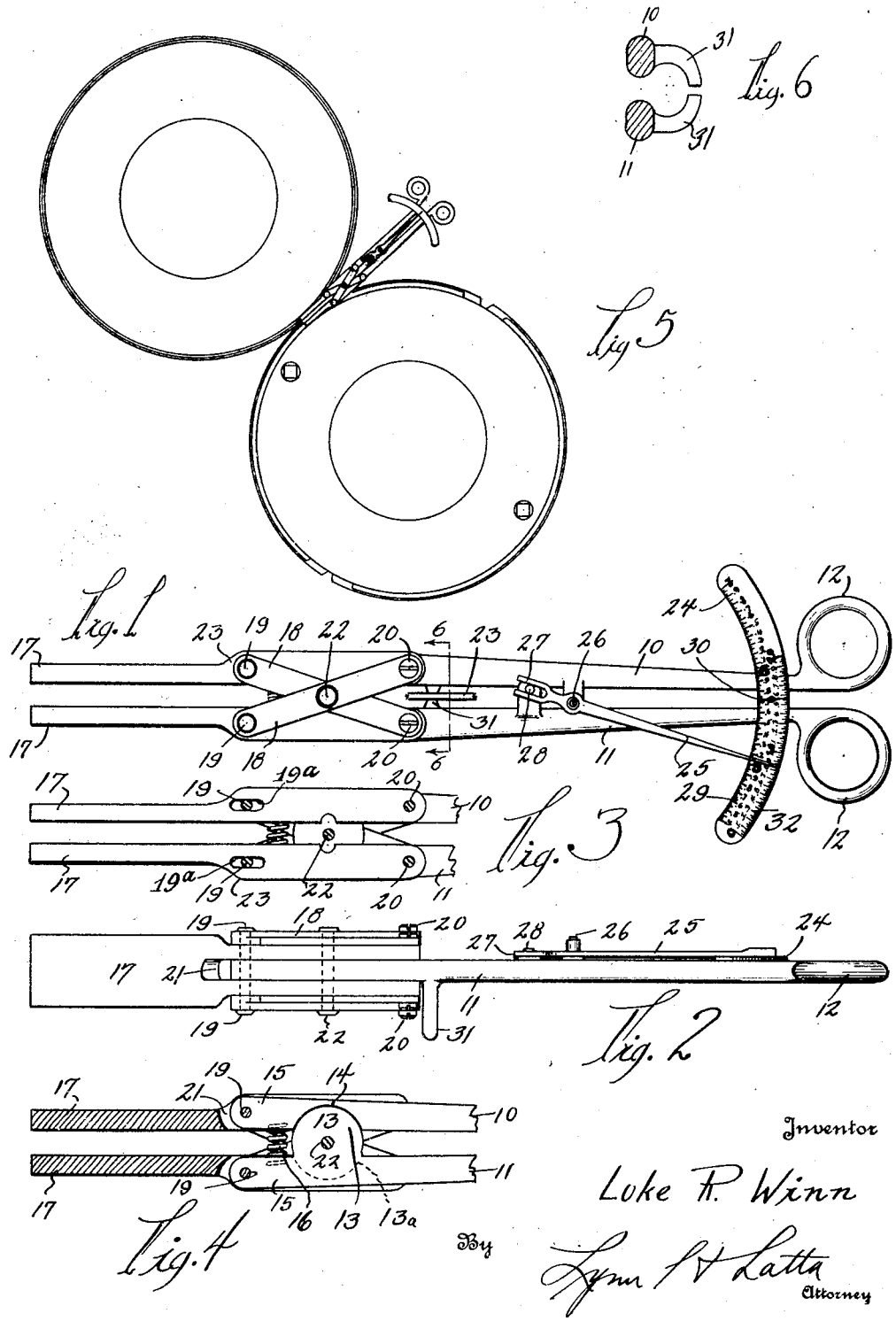

Patented Nov. 20, 1928.

1,692,014

UNITED STATES PATENT OFFICE.

LUKE R. WINN, OF SIOUX CITY, IOWA.

CALIPERS.

Application filed April 18, 1927. Serial No. 184,536.

My invention relates to measuring instruments, and it is my object to provide an instrument particularly adapted to calipering the distance between the cylinders of a printing press.

A further object is to provide such an instrument, so constructed as to be very convenient to handle.

A further object is to provide such an instrument which is not only convenient of handling but also is very sensitive as well.

Another object of my invention is to provide such an instrument, adapted not only to measure the distance between the cylinders of a printing press, but also to gauge the thickness of the blanket used on the impression roll as well.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view of the instrument, showing it employed for measuring the thickness of a sheet of material.

Fig. 2 is a side view of the instrument.

Fig. 3 is a fragmentary view with the toggle arms removed from one side thereof.

Fig. 4 is a sectional view taken longitudinally through the center of the instrument.

Fig. 5 is a diagrammatical view showing the instrument employed in gauging distance between a pair of press cylinders, and Fig. 6 is a sectional view taken on the line 6—6 of Fig. 1.

In newspaper web presses, the printing is done between a pair of cylinders comprising a plate cylinder and an impression cylinder, the former of which carries the printing plates and the latter of which carries the felt packing and rubber blanket to provide a resilient surface for the sharp faces of the type. In order to prevent pulling, scratching and wearing between the cylinder, the surfaces thereof must travel at the same speeds and consequently the cylinders must be adjusted to a certain distance apart and the packing be of a certain thickness.

Ordinarily the distance between the cylinders is .572 inches; the thickness of the rubber blanket is approximately .0625, and of the felt blankets .0825, the total thickness of the packing thus being .145.

Previously a steel gauge of the proper thickness has been used for setting the cylinder. Such a gauge, however, measures only one distance and the workman cannot tell how much his cylinders vary from the proper set by such a device.

My invention provides an instrument which will measure the distance between the cylinders between a range of approximately .25 of an inch. It comprises a pair of lever arms 10 and 11, formed at their ends with finger loops 12 and pivoted together near their other ends by means of integral semi-disc portions 13 and 13ª, each of which are one-half the thickness of the lever arms and joined face to face, curved cavities 14 being provided in the opposed arms to receive the disc portions. The lever arms 10 and 11 extend beyond the fulcrum, as at 15, and between these ends 15, a compression spring 16 is secured to urge the ends 15 apart.

The portions of the instrument which engage the cylinders, are formed as a pair of jaws 17, which are maintained in parallel positions at all times by the lazy tongs 18, pivoted to the arms 17 at their one ends by pins 19 extending entirely through the jaws and at their other ends by screws 20, extending into the jaws from their side. The object of employing the screws 20 is to allow the jaws to be cut away to provide the slots 21 to receive the lever arms 10 and 11, which are hung at their ends upon the pins 19. A fulcrum pin 22 extends through the disc portions 13 and 13ª and through the crossed portions of the lazy tongs 18, thus serving the double function of providing a fulcrum for the lever arms and for the toggle arms.

The spring 16 tends to move the lever arms 10 and 11 together at their finger engaging ends, this movement being limited by contact of the said ends.

It will now be seen that, when the lever arms are spread apart under the pressure of the fingers of the operator, the ends 15 will move together, the pins 19 serving to move the jaws 17 toward each other. The lazy tongs 18 will maintain the jaws 17 in parallel position as they move toward each other.

The advantage of thus maintaining the jaws in true parallel relation will be seen when it is considered that the printing cylinders are of considerable diameter and that in inserting the instrument between the cylinders, as shown in Fig. 5, the workman may not always insert it to the same depth so as to bring the same portions of the jaws between the closest portions of the cylinders. With the jaws parallel, it makes no difference to what depth the instrument is inserted, providing that the ends of the jaws pass the center line between the cylinders. In order that the instrument may not be inserted too far, the portions of the jaws, which are embraced between the lazy tongs 18, are widened to form the shoulders 23. This widening of the jaws further facilitates the forming of a strong joint between each end of a lazy tong 18 and the jaw.

The distance between the pivots 19 is always the same as the distance between the jaws 17 and is proportional to the distance between the lever arms 10 and 11 to any point along their length.

In order to transfer the distance between the arms 10 and 11 to a dial where it may be instantly read, I provide the dial or scale arm 24, which is secured to the arm 10 and movable relative to the arm 11. A pointer 25 is pivoted at 26 upon the arm 10 and has a fork 27, which slidingly receives a pin 28, secured to the arm 11. When the arms 10 and 11 are together, the pointer 25 will stand at the zero end of the scale arm and when spread to the limit, the pointer arm 25 will stand at the other end of the scale arm. The transfer of motion from the lever arms to the scale arms is thought to be evident from the drawing.

It may now be noted that, due to the ratio between the distance from the fulcrum 22 to the fulcrum 26, and the distance from the fulcrum 22 to the fulcrums 19, the movement of the arms 10 and 11 at the fulcrum 26 will be multiplied several times over the movement of the pins 19. The movement between the arms 10 and 11 at the fulcrum 26 is further multiplied several times at the end of the long pointer 25, as will be readily apparent from the drawings. In all, the movement between the pins 19 is multiplied approximately ten times to the end of the pointer arm 25, thus making it possible to obtain a very close reading upon the scale arm 24. The scale 29 is provided at one edge of the scale arm for the reading which indicates the distance between the jaws 17 and is calibrated from approximately .45 to approximately .7 in divisions which may be as small as .0025, as indicated upon the drawing. Thus the usual correct reading for the setting of a pair of cylinders will fall approximately at the center of the square arm and may be indicated by an emphasized line, as at 30, where the reading .5725 is thus emphasized.

For the gauging of the thickness of a blanket or the like, the lever arms 10 and 11 are provided with a pair of caliper points 31, (Fig. 6), located as near as is practical to the fulcrum 22 in order that the measuring of the instrument, when used in this capacity, may be as accurate as possible. Practically the same multiplication of movement is had between the caliper points 31 and the end of the pointer 25, as in the other case. The scale for the thickness gauge, as shown at 32, may range from zero to .2 of an inch or more. The instrument in Fig. 1 is shown measuring a blanket 33 and the pointer indicating a thickness of .825, which is correct for one of the blankets.

The advantages of the device are several. It is so constructed that the workman can readily grasp it with one hand and operate it with that hand so as to compress the jaws for insertion between a pair of press cylinders. The scale arm is positioned near the outer end of the device so that it may be easily read when the device is in this position, (Fig. 5). The variation from the proper distance between the cylinders will be so magnified by the pointer as to be readily calculated down to .250 of an inch. It is impossible to insert the instrument between the cylinders so as to obtain an incorrect reading except through the utmost negligence. The spring automatically pushes the jaws 17 into the proper engagement with the surfaces of the cylinders. The instrument combines inside and outside calipers with a single scale arm for obtaining both readings.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A measuring instrument comprising a pair of jaws, provided with parallel outer faces to be engaged between spaced objects, a spring to urge said jaws apart, means to maintain the parallel relationship of the faces while allowing the jaws to approach and recede from each other, a pair of lever arms, fulcrumed together, and each pivoted at one end to a respective jaw, and means associated with the other ends of the lever arms to indicate perpendicular distances between the jaws.

2. A measuring instrument comprising a pair of jaws provided with parallel outer faces to be engaged between spaced objects, lazy tongs connecting the jaws to maintain the parallel relationship of the faces while allowing the jaws to approach and recede from each other, a pair of lever arms fulcrumed together to form long and short arm portions, the end of each short arm portion being hinged to a respective jaw, and means associated with the long arm portions to indicate perpendicular distances between the jaws.

3. A measuring instrument comprising a pair of jaws, provided with parallel outer faces to be engaged between spaced objects, lazy tongs connecting the jaws to maintain the parallel relationship of the faces while allowing the jaws to approach and recede from each other, a pair of lever arms fulcrumed together to form long and short arm portions, the end of each short arm portion being hinged to a respective jaw, a scale arm carried by one of the lever arms, a swinging pointer fulcrumed upon one of the lever arms and adapted for movement over the scale arm, and means pivotally and slidingly attaching said pointer to the other lever arm.

4. A measuring instrument comprising a pair of jaws, provided with parallel outer faces to be engaged between spaced objects, means to maintain the parallel relationship of the faces while allowing the jaws to approach and recede from each other, a pair of lever arms, fulcrumed together, and each hinged at one end to a respective jaw, a scale arm carried by one of the lever arms, a swinging pointer fulcrumed upon one of the lever arms and adapted for movement over the scale arm, and means pivotally and slidingly attaching the pointer to the other lever arm.

5. A measuring instrument comprising a pair of lever arms fulcrumed together to provide long and short arm portions, jaws hinged to the ends of the short arm portions, lazy tongs connecting the jaws, comprising pairs of crossed arms, crossed and hinged together at the fulcrum axis of the lever arms, and hinged at their ends to the respective jaws, and means associated with the long arm portions to indicate perpendicular distances between the jaws.

Signed this 12 day of April, 1927, in the county of Woodbury and State of Iowa.

LUKE R. WINN.